(12) United States Patent
Gadkari et al.

(10) Patent No.: US 7,653,763 B2
(45) Date of Patent: Jan. 26, 2010

(54) SUBSYSTEM BOOT AND PERIPHERAL DATA TRANSFER ARCHITECTURE FOR A SUBSYSTEM OF A SYSTEM-ON-CHIP

(75) Inventors: Mileend Gadkari, Milpitas, CA (US); Harsimran S. Grewal, Los Gatos, CA (US); George Apostol, Jr., Santa Clara, CA (US)

(73) Assignee: Cavium Networks, Inc., Mountain View, CA (US)

( * ) Notice: Subject to any disclaimer, the term of this patent is extended or adjusted under 35 U.S.C. 154(b) by 426 days.

(21) Appl. No.: 10/469,529

(22) PCT Filed: Feb. 28, 2002
(Under 37 CFR 1.47)

(86) PCT No.: PCT/US02/06331
§ 371 (c)(1),
(2), (4) Date: Aug. 28, 2003

(87) PCT Pub. No.: WO02/069157
PCT Pub. Date: Sep. 6, 2002

(65) Prior Publication Data
US 2004/0186930 A1    Sep. 23, 2004

Related U.S. Application Data

(60) Provisional application No. 60/272,439, filed on Feb. 28, 2001.

(51) Int. Cl.
*G06F 13/28* (2006.01)
*G06F 15/177* (2006.01)

(52) U.S. Cl. .................. 710/22; 713/1; 713/2; 713/100
(58) Field of Classification Search .................... 713/1, 713/2, 100; 710/22, 24; 711/170
See application file for complete search history.

(56) References Cited

U.S. PATENT DOCUMENTS

| | | | |
|---|---|---|---|
| 4,352,952 A | 10/1982 | Boone et al. | |
| 4,697,262 A | 9/1987 | Segal et al. | |
| 5,185,864 A | 2/1993 | Bonevento et al. | |
| 5,197,130 A | 3/1993 | Chen et al. | |
| 5,222,223 A | 6/1993 | Webb, Jr. et al. | |
| 5,224,166 A | 6/1993 | Hartman, Jr. | |
| 5,353,417 A * | 10/1994 | Fuoco et al. | 710/309 |

(Continued)

FOREIGN PATENT DOCUMENTS

WO    WO 01/18997 A1    3/2001

(Continued)

*Primary Examiner*—Niketa Patel
*Assistant Examiner*—Ernest Unelus
(74) *Attorney, Agent, or Firm*—Hamilton, Brook, Smith & Reynolds, P.C.

(57) ABSTRACT

A subsystem (200) is provided at least Direct Memory Access (DMA) device (220) utilized to provide instructions to facilitate the operation of a subsystem processor (210). In one embodiment, a system level processor (102) initiates the provision of instructions for a subsystem (210). The DMA device may be additionally or alternatively utilized to provide data transfer capabilities to a plurality of data channels in a subsystem (200). The DMA device processes channels in a time limited manner to ensure that data is processed in a manner appropriate for time critical data.

20 Claims, 8 Drawing Sheets

U.S. PATENT DOCUMENTS

| | | | |
|---|---|---|---|
| 5,388,261 A * | 2/1995 | Anderson et al. | 718/107 |
| 5,606,668 A | 2/1997 | Shwed | |
| 5,657,472 A | 8/1997 | Van Loo et al. | |
| 5,668,813 A | 9/1997 | Malek et al. | 370/514 |
| 5,799,207 A | 8/1998 | Wang et al. | |
| 5,812,799 A | 9/1998 | Zuravleff et al. | |
| 5,848,367 A * | 12/1998 | Lotocky et al. | 701/36 |
| 5,905,876 A | 5/1999 | Pawlowski et al. | |
| 6,021,201 A | 2/2000 | Bakhle et al. | |
| 6,028,939 A | 2/2000 | Yin | |
| 6,034,542 A | 3/2000 | Ridgeway | |
| 6,058,474 A * | 5/2000 | Baltz et al. | 713/1 |
| 6,081,852 A * | 6/2000 | Baker | 710/24 |
| 6,118,462 A | 9/2000 | Margulis | |
| 6,122,690 A | 9/2000 | Nannetti et al. | |
| 6,185,520 B1 | 2/2001 | Brown et al. | |
| 6,247,084 B1 * | 6/2001 | Apostol et al. | 710/108 |
| 6,317,803 B1 | 11/2001 | Rasmussen et al. | |
| 6,321,285 B1 | 11/2001 | Sheafor et al. | |
| 6,321,318 B1 * | 11/2001 | Baltz et al. | 711/170 |
| 6,347,344 B1 | 2/2002 | Baker et al. | |
| 6,473,810 B1 * | 10/2002 | Patel et al. | 710/7 |
| RE37,980 E | 2/2003 | Elkhoury et al. | |
| 6,549,965 B1 * | 4/2003 | Jones et al. | 710/264 |
| 6,557,078 B1 | 4/2003 | Mulla et al. | |
| 6,560,160 B1 | 5/2003 | Grace | |
| 6,675,243 B1 * | 1/2004 | Bastiani et al. | 710/105 |
| 6,681,270 B1 | 1/2004 | Agarwala et al. | |
| 6,778,667 B1 | 8/2004 | Bakhle et al. | |
| 6,784,890 B1 | 8/2004 | Bergeson et al. | |
| 7,020,763 B2 * | 3/2006 | Saulsbury et al. | 712/24 |
| 7,035,966 B2 * | 4/2006 | Zitlaw | 711/103 |
| 7,237,105 B2 * | 6/2007 | Fujita et al. | 713/2 |
| 7,296,143 B2 * | 11/2007 | Gaskins et al. | 713/2 |
| 2001/0026439 A1 | 10/2001 | Geusic et al. | |
| 2001/0049726 A1 | 12/2001 | Comeau et al. | |
| 2002/0069354 A1 * | 6/2002 | Fallon et al. | 713/2 |
| 2003/0188118 A1 * | 10/2003 | Jackson | 711/165 |
| 2003/0189573 A1 | 10/2003 | Dahlen et al. | |
| 2004/0128144 A1 * | 7/2004 | Johnson et al. | 704/278 |
| 2004/0172490 A1 * | 9/2004 | Stadler et al. | 710/22 |
| 2004/0250056 A1 * | 12/2004 | Chang | 713/1 |

FOREIGN PATENT DOCUMENTS

| | | | |
|---|---|---|---|
| WO | WO-01/18997 A1 | 3/2001 | |

* cited by examiner

| Memory Location | Contents |
| --- | --- |
|  |  |
| 01002F00 – 01002FFF | Segment 1.1 Data |
|  |  |
| 2657DE00 – 2657DFFF | Segment 1.3 Data |
|  |  |
| 29872200 - 2987220C | Segment 1.3 Descriptor |
|  |  |
| 31000E00 – 31000E0C | Segment 2.1 Descriptor |
| 31000E0D – 310014FF | Segment 1.2 Data  — 410 |
|  |  |
| 98123700 – 9812370C | Segment 1.1 Descriptor |
|  |  |
| C1298200 - C129820C | Segment 1.2 Descriptor |
|  |  |
| D989F000 – D989FFFF | Segment 2.1 Data |

Figure 4

| 5 | 4 | 3 | 2 | 1 | 0 | |
|---|---|---|---|---|---|---|
| | Configuration Register [15:0] | | | | | 510 |
| | Configuration Register [20:16] | | | | 0x001 | 525 |
| | 510 | | | | | |
| | 29872200 | | | | | 530 |
| | D898F000 | | | | | 540 |
| | D898FFFF | | | | | 550 |
| | System address low | | | | | 560 |
| | System address high | | | | | 570 |

| Peripheral Device Input FIFO | Peripheral Device 1 | Peripheral Device Output FIFO |
|---|---|---|
| 232A | 232 | 232B |

Figure 6

| Register | Value |
| --- | --- |
| Peripheral 1 – Descriptor Address | C1298200 |
| Peripheral 2 – Descriptor Address | 31000E00 |
| Peripheral 3 – Descriptor Address | 12345678 |
| . . . | |
| Peripheral 16 – Descriptor Address | FDECBA98 |

SUBSYSTEM BOOT AND PERIPHERAL DATA TRANSFER ARCHITECTURE FOR A SUBSYSTEM OF A SYSTEM-ON- CHIP

RELATED APPLICATION

This application claims priority to U.S. Provisional Application No. 60/272,439, entitled "MULTI-SERVICE PROCESSOR INCLUDING A MULTI-SERVICE BUS", filed Feb. 28, 2001, the specification of which is hereby fully incorporated by reference.

BACKGROUND OF THE INVENTION

1. Field of the Invention

The present invention relates to the field of integrated circuits. More specifically, the present invention relates to the provision of multi-channel data transfer services and a boot architecture using a DMA in a subsystem of a system on a chip (SOC) design.

2. Background Information

Advances in integrated circuit technology have led to the birth and proliferation of a wide variety of integrated circuits, including but not limited to application specific integrated circuits, micro-controllers, digital signal processors, general purpose microprocessors, and network processors. Recent advances have also led to the birth of what is known as "system on a chip" or SOC. In these designs, frequently they are composed of multiple smaller designs combined to form a complex SOC design.

In the operation of these smaller designs, or subsystems, a subsystem processor will be responsible for the function of the subsystem. Such a subsystem processor will typically have in its address space instructions to operate the subsystem processor. During the initialization process of a subsystem in a SOC, frequently it is desirable to have a system level processor provide the instructions that operate the subsystem processor. The provision of the instructions to operate the subsystem processor should be done in as efficient a manner as possible.

Frequently today's SOC designs comprise subsystems that are transferring data that must be delivered in a time sensitive manner. Examples of such time sensitive data include voice and video data. In the processing of such data, frequently Direct Memory Access (DMA) devices are used to relieve the subsystem processor of the data transfer task. In designing such a subsystem, the design of such DMA devices should be done in as efficient a manner as possible.

Thus, any architectural improvement to the subsystem to increase efficiency of such provision is desirable.

BRIEF DESCRIPTION OF DRAWINGS

The present invention will be described by way of exemplary embodiments, but not limitations, illustrated in the accompanying drawings in which like references denote similar elements, and in which:

FIG. 4 illustrates memory usage for data segments and descriptors, in accordance with one embodiment;

FIG. 5 illustrates an exemplar descriptor, in accordance with one embodiment;

FIG. 6 illustrates a peripheral device, including data FIFOs, in accordance with one embodiment;

FIG. 8 illustrates a set of registers providing descriptor locations for data associated with peripheral devices, in accordance with one embodiment.

DETAILED DESCRIPTION OF THE INVENTION

The present invention provides a unique architecture for the design of a subsystem with a Direct Memory Access (DMA) device that advantageously provides multiple data channel support as well as the ability to load instructions for a subsystem processor while doing so in a manner designed to reduce the hardware required and reducing the load on a subsystem processor. In the following description, various features and arrangements will be described, to provide a thorough understanding of the present invention. However, the present invention may be practiced without some of the specific details or with alternate features/arrangement. In other instances, well-known features are omitted or simplified in order not to obscure the present invention.

The description to follow repeatedly uses the phrase "in one embodiment", which ordinarily does not refer to the same embodiment, although it may. The terms "comprising", "having", "including" and the like, as used in the present application, including in the claims, are synonymous.

Subsystem Initialization

Figure 1:
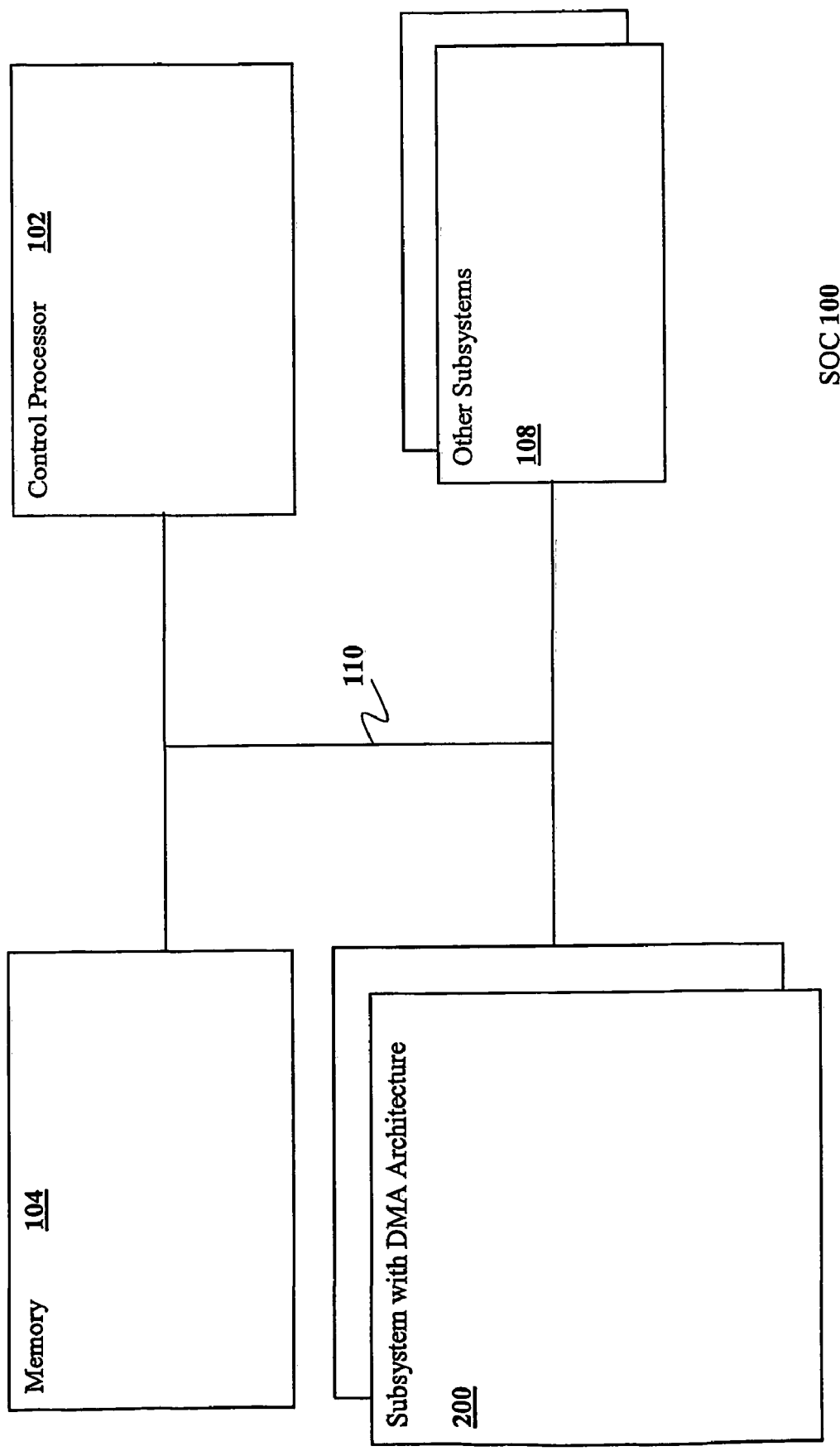
FIG. 1 illustrates an overview of a system on-chip including an on-chip bus and a number of subsystems coupled to the on-chip bus, in accordance with one embodiment.

Referring now to FIG. 1, wherein a block diagram illustrating an overview of a SOC 100 including control processor 102, memory 104, a subsystem containing a DMA 200 incorporated with the teachings of the present invention, and other subsystems 108, in accordance with one embodiment, is shown. As illustrated, for the embodiment, control processor 102, memory 104, DMA subsystem 200 and other subsystems 108 are coupled to each other via on-chip bus 110, and communicate with each other in accordance with a predetermined bus protocol. In one embodiment, the on-chip bus and the bus protocol is the on-chip bus described in co-pending U.S. application Ser. No. 10/086,938, contemporaneously filed, entitled "A Multi-Service System On-Chip Including On-Chip Memory with Multiple Access Paths", which specification is hereby fully incorporated by reference. In other embodiments, other bus architectures and other bus communication protocols may be employed instead.

Figure 2:
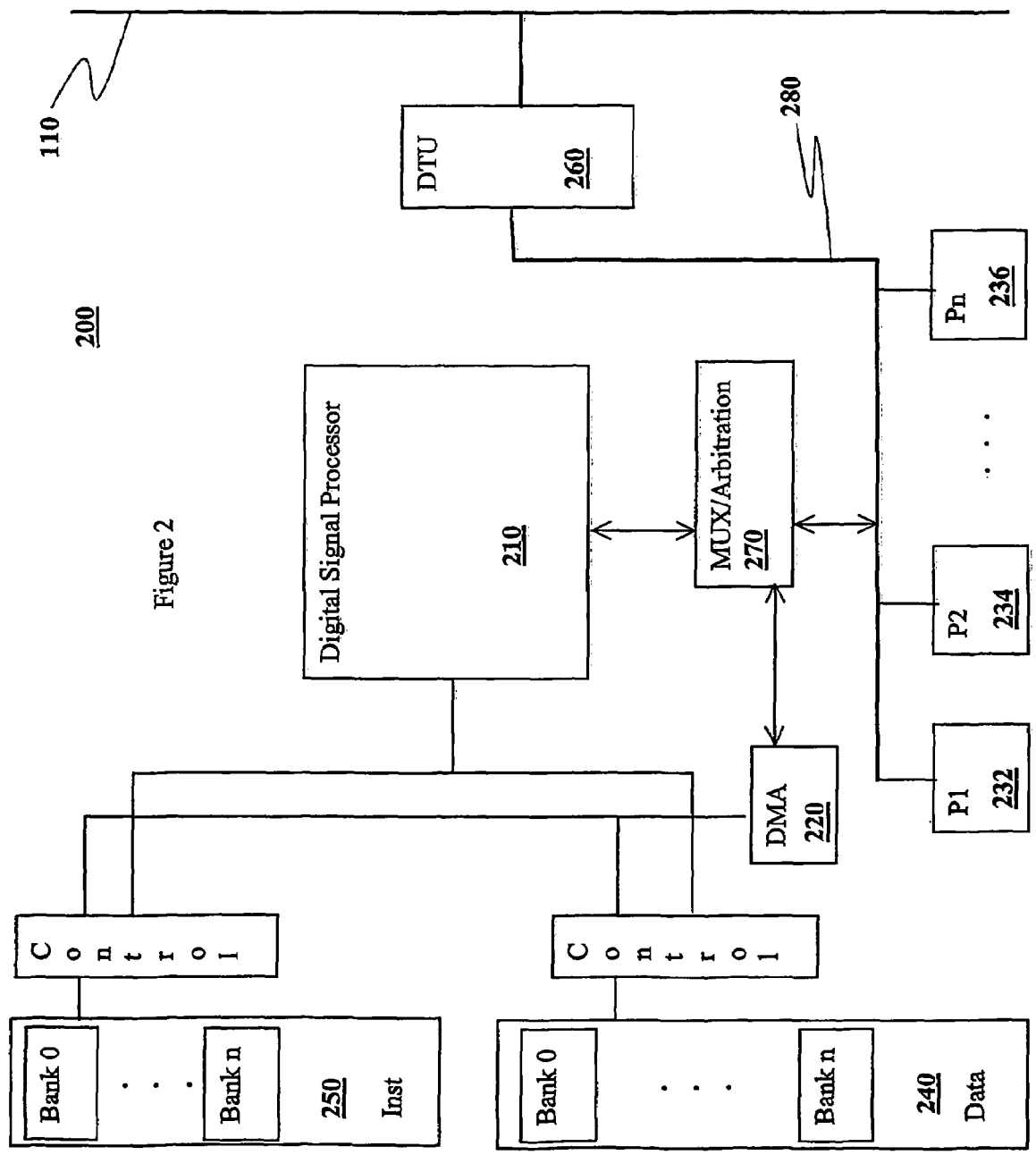
FIG. 2 illustrates an architecture of a subsystem of an SOC design, in accordance with one embodiment.

FIG. 2 shows a subsystem designed in accordance with one embodiment of the present invention. In this embodiment, subsystem processor 210, a Digital Signal Processor (DSP), and a direct memory access (DMA) device 220 will use the subsystem bus 280 to transfer information to/from peripheral devices 232-236 260 and data memory 240. Peripheral devices may be any peripheral devices that can be serviced by the subsystem processor 210. In one embodiment, peripheral devices are voice units for capturing voice information. Instruction memory 250 contains instructions for execution by the subsystem processor 210. Data Transfer Unit (DTU) 260 is employed to facilitate receipt of, among other things, commands from a control processor 102 for the SOC design 100. One embodiment of DTU 260 is described in the aforementioned Ser. No. 10/086,938 co-pending and incorporated by reference U.S. patent application.

In this embodiment, in the normal operation of the subsystem 200, the subsystem processor 210, in this case a Digital Signal Processor (DSP), is the master of the control over access to the two shown memory banks 240 250. In another embodiment, the subsystem processor is a network processor responsible for the framing and deframing of network packets. In one embodiment, the subsystem processor is a general purpose subsystem processor which depending on the control code may operationally function as a DSP, a network processor or other application specific processor. The instruction memory 250 contains information for the operation of the subsystem processor 210 (e.g. processor execution code) and the data memory 240 contains data store for use in the processing of data going to and from the peripherals 232-236 260.

Figure 3:
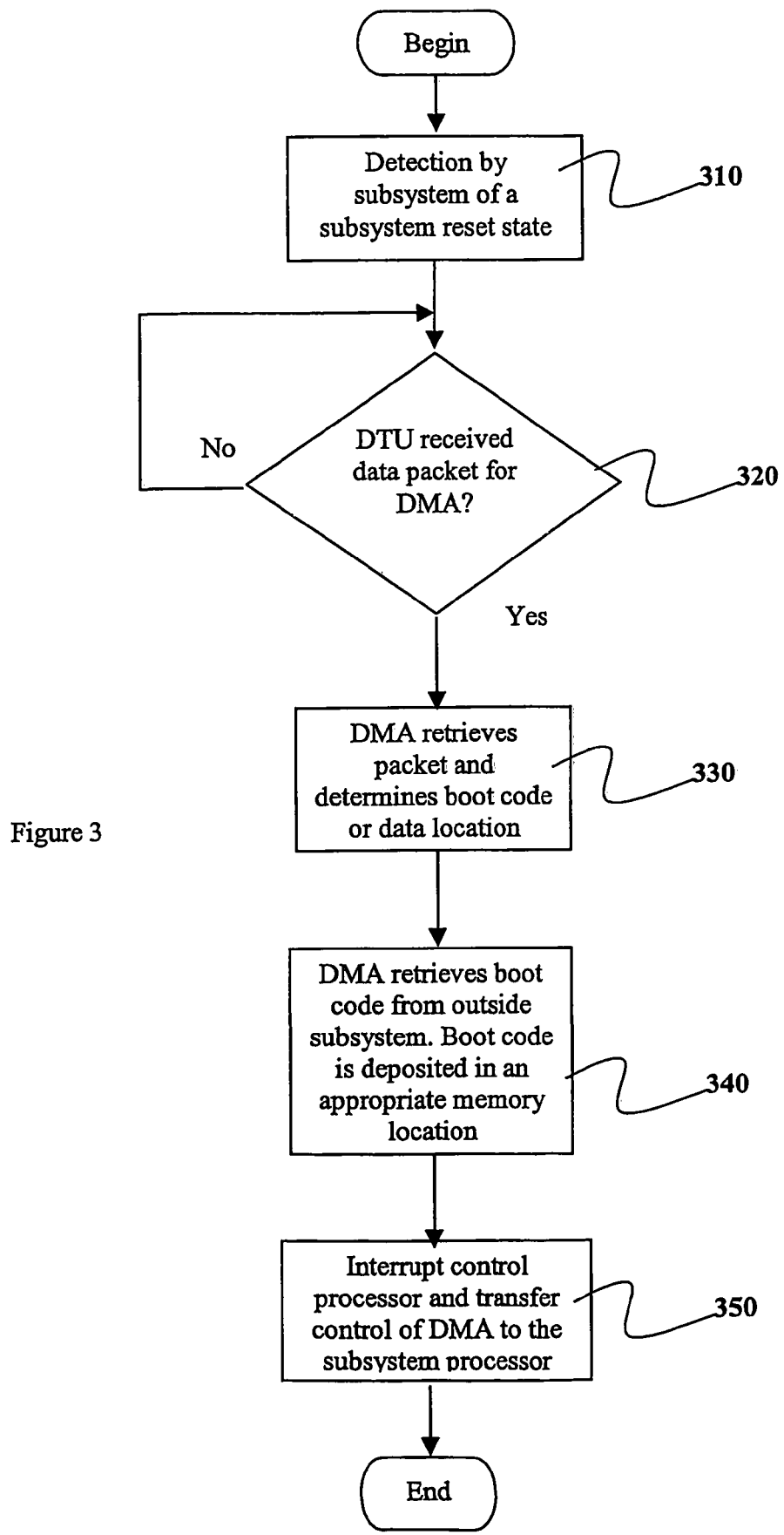
FIG. 3 illustrates a flow diagram of the boot control state machine, in accordance with one embodiment.

Refer now to FIG. 3 where a flow diagram showing a process for initializing the subsystem 200 is shown. During the initialization process of the subsystem 200, the DMA device 220 has control over access to the memory arrays 240 250 and the subsystem bus 280. The DMA device 220 will detect its entrance to a DMA reset state, as part of the subsystem reset 310. In one embodiment, this subsystem DMA reset state can result from the subsystem being powered on. In another embodiment, the control processor 102 controls the subsystem DMA reset state entrance. In either case, upon reset, the DMA device 220 will await notification by the DTU 260 of the subsystem that a data packet has been received by the DTU 260. In this embodiment, the data packet contains configuration information that is directed to the DMA device 220 320.

In one embodiment, the data packet is received by the DTU 260 from a control processor 102. In another embodiment, the data packet is received by the DTU from another subsystem 108 of the SOC design 100. Except for the teachings of the present invention incorporated in subsystems 108, to have subsystems provide boot code and/or the location of boot code to DMA subsystem 200, subsystems 108 may otherwise be any one of a broad range of subsystems known in the art or to be developed.

The DMA device 220 will retrieve the data packet from the DTU 260 and extract from the data packet information on the location of boot code for the subsystem 200 330. In one embodiment, the location of the boot code can be divided among multiple data packets. The location of the boot code is a location that is external to the subsystem 200. In one embodiment, the boot code is located in another subsystem 108 of the SOC 100. In one embodiment, the boot code is of a type that particularizes the functionalities of a general purpose subsystem processor. In another embodiment, the boot code is located in the memory 104 of the SOC design. Except for its use for its conventional function of storing data, in particular boot code of the present invention providing initialization information to the subsystem of the present invention, memory 104 may otherwise be any one of a broad range of volatile or non-volatile storage units known in the art or to be developed. In one embodiment, the memory 104 is a storage unit with multiple access paths, which is the subject matter of the aforementioned co-pending and incorporated by reference U.S. patent application Ser. No. 10/086,938.

After determining the external subsystem location for the boot code, the DMA device 220 will transfer the boot code from the identified location, through the DTU 260, to a memory unit of the subsystem 340. In one embodiment, the boot code will be transferred to an instruction memory device 250. After the boot code has been transferred, the DMA 220 will then transfer control of the DMA 220 to the subsystem processor 210. In one embodiment, transfer of control to the subsystem processor 210 is performed by the DMA 220 interrupting the subsystem processor 210. In another embodiment, the control processor 102 is also interrupted by the DMA 220 upon transfer of the DMA control to the subsystem processor 210.

The memory unit of the subsystem used to store the boot code is located such that, once the transfer of control for the subsystem 200 is made to the subsystem processor 210, the subsystem processor 210 can begin processing the loaded boot code. In one embodiment, the location of the stored boot code is such that no information on the location of the boot code is provided to the subsystem processor 210 when it is interrupted and transferred control. The location where the boot code is stored is at a fixed reset location in the memory space of the subsystem processor 210. In another embodiment, the location is stored at a variable location in the memory space of the subsystem processor 210. In this case, upon interrupt of the subsystem processor 210, the location of the boot code is provided to the subsystem processor 210.

In one embodiment, the boot code is a portion of the complete subsystem processor 210 code. In this embodiment, the subsystem processor 210 will execute the boot code in an attempt to perform basic subsystem 200 diagnostic to ensure the proper function of a portion of the subsystem 210. The subsystem processor 210 will then transfer, through the DTU 260, additional operating code for the operation of the subsystem processor 210. In another embodiment, the boot code is the complete subsystem processor 210 code.

The subsystem described herein may accommodate peripheral devices for a variety of different functionalities including but not limited to voice devices, video devices and data devices. Thus, the subsystem operating instructions that are to be loaded during the subsystem initialization can be dependant on the type of subsystem devices to be used. Resultantly, the current architecture advantageously allows a generic subsystem to be developed.

DMA Channel Interleaving

Another advantage of the present invention is the ability to have a single DMA that operates on behalf of a number of peripheral devices while still maintaining proper DMA response. By limiting the DMA processing to a signal engine which interleaves processing of each channel, significant control logic, such as would be required for multiple DMA engines, can be saved.

Refer again to FIG. 2 wherein a subsystem in accordance with the present invention is shown. In this embodiment, multiple peripheral devices 232-236 260 are serviced by the single DMA engine 220. While certain peripheral devices, and their corresponding data, are not sensitive to the amount of time between processing of data by a DMA device, there are certain types of applications that are so sensitive. For example, as previously mentioned, the peripheral devices may be voice units for capturing voice data. Voice data is such that it frequently requires real time processing to avoid discontinuities in the communication. Thus, the present DMA architecture advantageously provides the ability to prevent a channel from not being timely serviced.

FIGS. 4-6 are used to illustrate an example of a system configured in accordance with one embodiment of the present invention. FIG. 4 shows a view of a data memory device 240 containing several segments of data from two peripheral devices 232-234. Each segment represents a portion of data to be transferred to or from the peripheral device. For example, segment 1.1 indicates segment 1 of peripheral device 1, whereas segment 1.2 indicates segment 2 of peripheral device 1. FIG. 6 shows a block diagram of an exemplar peripheral device 232, including input FIFO 232A and output FIFO 232B queues for data being transferred to or from the peripheral device. By incorporating such queues on the peripheral devices, DMA usage of the subsystem data bus 280 can be reduced.

FIG. 5 shows one embodiment of a descriptor for segment 1.2 in the data memory device of FIG. 4. In this embodiment the descriptor contains a configuration register 510, peripheral device address 525, next descriptor address 530, start 540 and end 550 addresses for the location of the described segment in data memory 240, and the location of the beginning address of the location in the system memory 104 for the transfer of the data segment. With the exception of the teaching of the present invention, configuration register bits 510 for the descriptor are meant to describe any configuration abilities of DMA descriptors now known or to be developed.

Figure 7:
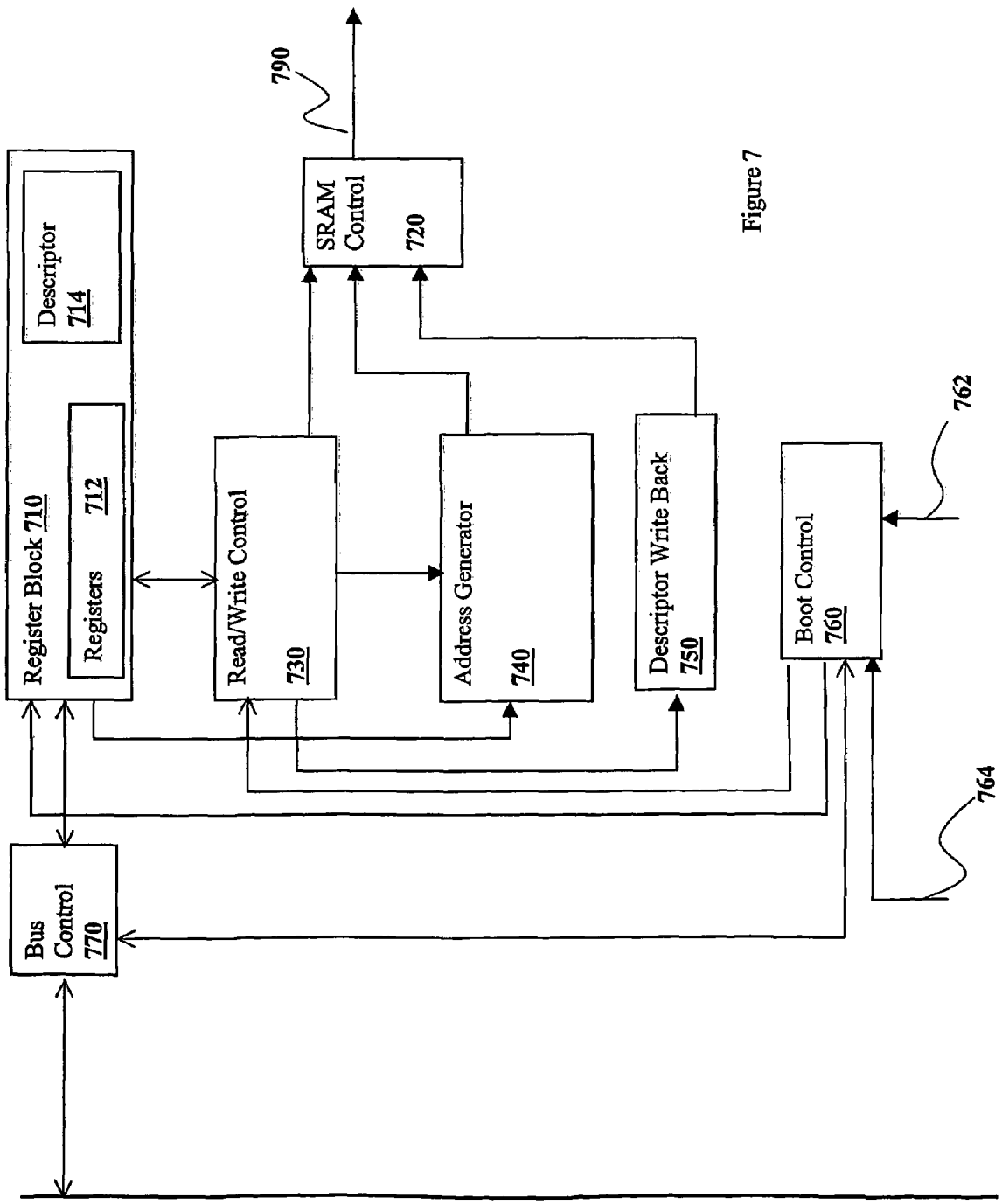
FIG. 7 illustrates a block diagram of a DMA architecture, in accordance with one embodiment.

Assume that segment 1.2 410 is to be processed by the DMA engine 220. FIG. 7 shows a DMA engine, to be described more fully below, consistent with the present invention. The DMA engine contains a register block 710 containing registers 712 for each channel in the subsystem where each channel represents a peripheral device 232-236. In one embodiment the register block contain registers for 16 channels. FIG. 8 shows a set of registers for one embodiment of the register block shown in FIG. 7 712. Each register contains a pointer to a location of the current processed descriptor for a channel. Thus, when a particular channel is to be processed, the DMA determines, based on the information contained in the register block, where to look for the appropriate descriptor.

In one embodiment, the register block will contain an active descriptor 714 providing the active descriptor information for the data being processed. Thus, when a given channel is to be processed, a descriptor, similar to that shown in FIG. 5, will be loaded in DMA engine to facilitate processing of that channel. From the descriptor shown in FIG. 5, the location of the data segment described by the descriptor 500 is from start location D898F000 to end location D898FFF as provided by registers 540 550 in the descriptor 500. Descriptor 500, as described in further detail below, advantageously contains the next descriptor address 530 in the memory space 240 of the next descriptor to be processed for the channel.

Figure 9:
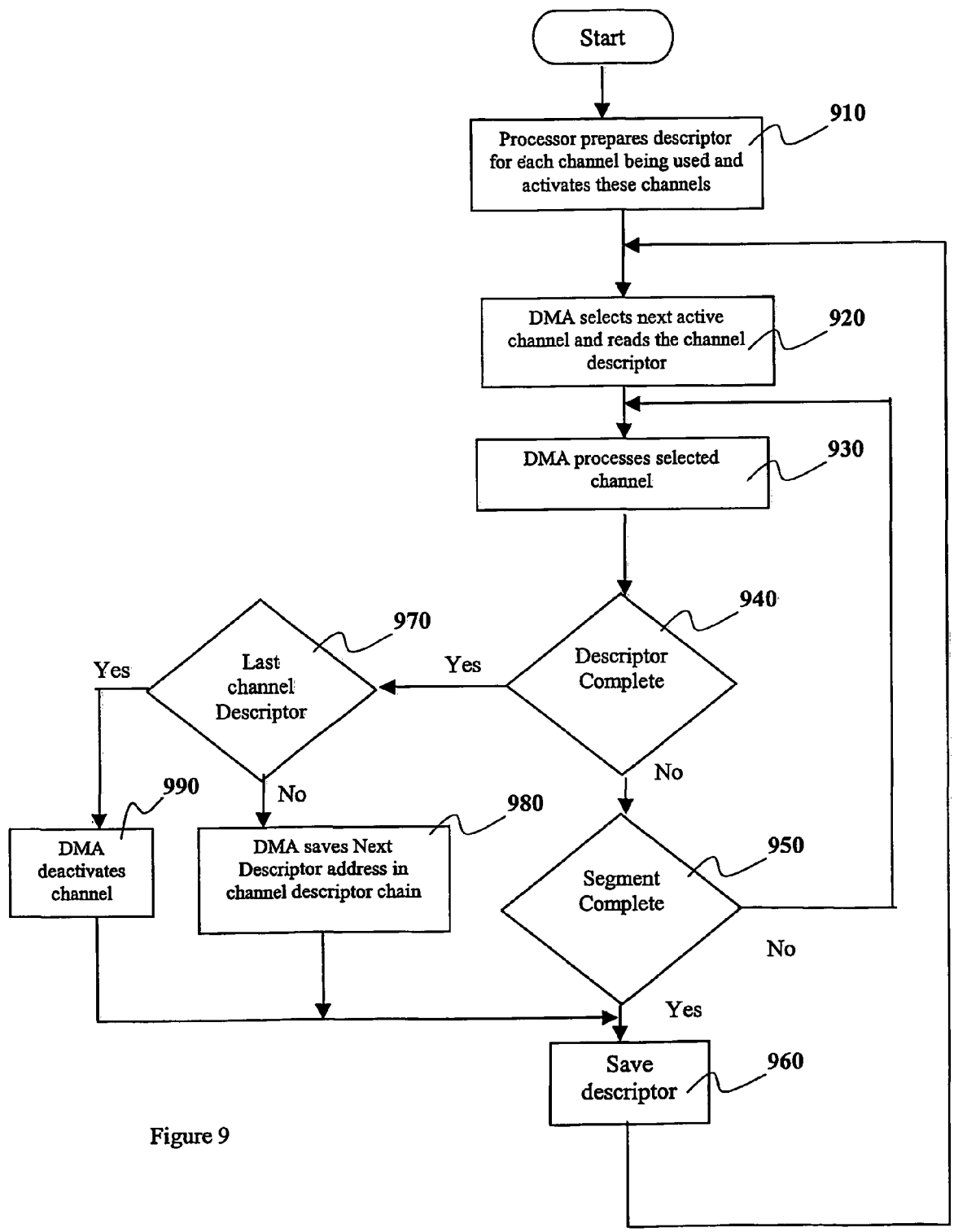
FIG. 9 illustrates a flow diagram for a DMA incorporating descriptor write back logic, in accordance with one embodiment.

FIG. 9 shows a flow diagram indication one embodiment of the interleaving of the present invention. In the present embodiment, prior to usage of the DMA, a subsystem processor will initialize each channel for use. For example, in one embodiment, the subsystem processor 210 will set active bits in the configuration register 510 for all channels to inactive. In one embodiment, when a channel is ready for processing, the subsystem processor 210 will load the descriptors for the channel and activate the channel 910. The DMA engine 220 will then process the first descriptor. That is, the DMA engine 220 will begin transferring the data from the appropriate source location to the appropriate destination location. With the exception of the novel features describer herein, the DMA engine 220 is meant to describe a broad range of DMA engines known in the art or to be developed. Thus, the method of transferring data from source to destination will not be described further. Thus, for the illustrated embodiment, the data is transferred until either the descriptor is completely processed 940 or a segment subset (burst) length is processed 950. If the segment subset length is reached, then the location where the current transfer ends is updated and saved 960. Thus, in the illustrated embodiment of FIG. 5, assume that after starting the initial processing of the D898F000, 64 bytes are transferred until the segment subset size is met. In this case, the next byte to be transferred would be D898F080. Thus, this new address is saved to the start address 540 for the channel and thus the descriptor is updated. This descriptor is then saved 960 such that when the descriptor is loaded when this channel is to be further processed, the proper starting location will be loaded. After the descriptor is saved, a descriptor for the next channel active for processing, as indicated in one embodiment by an active bit in the configuration register, will be fetched 920 and processing begins by the DMA engine on the segment represented by the newly loaded descriptor 930.

If a descriptor has completed its processing 940, and there are more descriptors available for the channel 970, the next descriptor address 530 is saved so that the next descriptor can be fetched and processed when the channel is next serviced 980. Refer again to the exemplar descriptor 500 from FIG. 5. When processing the segment, but before the burst size is complete, the end address for the segment, D898FFFF 550 is processed. At this time, the address of the next descriptor for the current channel is obtained from the next descriptor address field 530 of the current descriptor. In the embodiment shown, address 29872400 is then saved 980. If a descriptor has completed its processing 940, and there are no more descriptors available for the channel 970, the channel is deactivated by the DMA engine 990.

Thus, by performing the updating of the active descriptor when a new segment is to be processed, the present invention advantageously reduces the required interaction of the subsystem processor in the ongoing operation of the DMA. In this manner, the subsystem processor is provided with additional bandwidth for handling other subsystem functionality, while at the same time, the subsystem is only burdened with the circuitry for a single DMA engine.

DMA ARCHITECTURE

Refer again to FIG. 7 where a block diagram of one embodiment of a DMA consistent with the present invention is shown. As previously discussed, the DMA is notified of a subsystem DMA reset via reset signal 762. Under this condition a boot control state machine 760, as previously described, assumes control of the bus. The boot state machine 760 waits for a notification 764 from the DTU 260 that a configuration packet has been received. The boot control 760 then reads the configuration packet from the DTU 260 and, in accordance with the location information therein, sets up DMA registers for transfer of boot code from a location outside of the subsystem 200 to the instruction memory 250. Upon completion of the transfer of the boot code, boot control logic 760 notifies control processor 102 of the completion and relinquishes control of the subsystem bus 280 to the subsystem processor. In response to this notification, the control processor 102 can take the subsystem processor 210 out of its reset state. The descriptor write back logic 750 interacts with the read/write control 730 to perform the saving the of the descriptor information as previously discussed. With the exception of the interaction of the read/write control 730 and address generation 740 required to aid in the aforementioned advantageous functions described herein, these portions perform there functions know in the art and will not be described further.

CONCLUSION AND EPILOGUE

Thus, it can be seen from the above descriptions, an improved DMA subsystem method and apparatus for performing boot code loading and channel management for subsystems of an SOC design has been described. The novel scheme allows a subsystem to be provided boot code independent of the type of subsystem. In addition, it allows the subsystem to operate more efficiently by relieving the subsystem processor of sufficient DMA channel management. The present invention may be practiced with modification and alternation within the spirit and scope of the appended claims. Thus, the description is to be regarded as illustrative instead of restrictive on the present invention.

What is claimed is:

1. In a subsystem of a system, a method comprising:
    a Direct Memory Access (DMA) device of the subsystem detecting a subsystem reset state;
    in response, the DMA device awaits notification by a data transfer unit of the subsystem, of receipt of a data packet, including address location information identifying storage locations external to said subsystem where boot code of said subsystem are stored, addressed to the DMA device from a device external to the subsystem;
    retrieving from said data transfer unit said received data packet, by said DMA device, extracting from said retrieved data packet, the address location information identifying storage locations external to said subsystem where boot code of said subsystem are stored, accessing said external storage locations using the extracted address location information through said data transfer unit, by said DMA device, and transferring said boot code into a memory unit of said subsystem; and
    interrupting a processor of said subsystem by said DMA device to transfer control to said processor to execute said boot code to start up said subsystem.

2. The method of claim 1 wherein said boot code of said subsystem is transferred to a location known to said processor.

3. The method of claim 1 wherein said boot code of said subsystem is transferred to a location and said location is provided to said processor.

4. The method of claim 1 wherein said boot code comprises minimal operating instructions, including instructions to obtain complete operating instructions for the subsystem.

5. The method of claim 1 wherein said boot code comprises complete operating instructions for the subsystem.

6. The method of claim 1 wherein the subsystem is a digital signal processor subsystem.

7. The method of claim 1 wherein the subsystem is a network packet framing/deframing processor subsystem.

8. The method of claim 1 wherein the method further comprises said processor awaiting said interrupt from said DMA device, upon detecting said reset state.

9. The method of claim 1 wherein the processor, as part of said starting up of said subsystem, and subsequent to said start up, configuring said DMA device for data read/write operations.

10. The method of claim 1 wherein said interrupting a processor of said subsystem further comprises interrupt a control processor of said system.

11. A subsystem of a system comprising:
    a processor;
    a data transfer unit;
    a Direct Memory Access (DMA) device to detect a subsystem reset state where, in response to said detection, said DMA device awaits notification by said data transfer unit of receipt of a data packet, including address location information identifying storage locations external to said subsystem where boot code of said subsystem are stored, addressed to said DMA device from a device external to the subsystem and where said DMA device retrieves from said data transfer unit said received data packet and extracts from said retrieved data packet the address location information identifying storage locations external to said subsystem where boot code of said subsystem is stored and where said DMA accesses said external storage locations using the extracted address location information through said data transfer unit and transfers said boot code into a memory unit of said subsystem and said DMA interrupts said processor of said subsystem to transfer control to said processor to execute said boot code to start up said subsystem.

12. The subsystem of claim 11 wherein said DMA further operates to transfer said boot code of said subsystem to a location known to said processor.

13. The subsystem of claim 11 wherein said DMA further operates to transfer said boot code of said subsystem to a location and said DMA provides said location to said processor.

14. The subsystem of claim 11 wherein said boot code comprises minimal operating instructions, including instructions to obtain complete operating instructions for the subsystem.

15. The subsystem of claim 11 wherein said boot code comprises complete operating instructions for the subsystem.

16. The subsystem of claim 11 wherein said subsystem is a digital signal processor subsystem.

17. The subsystem of claim 11 wherein said subsystem is a network packet framing/deframing processor subsystem.

18. The subsystem of claim 11 wherein the said processor operates to await said interrupt from said DMA device, upon detecting said reset state.

19. The subsystem of claim 11 wherein the processor, as part of said starting up of said subsystem, and subsequent to said start up, configuring said DMA device for data read/write operations.

20. The subsystem of claim 11 wherein the DMA, as part of said interrupting a processor of said subsystem further interrupt a control processor of said system.

* * * * *

UNITED STATES PATENT AND TRADEMARK OFFICE
CERTIFICATE OF CORRECTION

PATENT NO. : 7,653,763 B2
APPLICATION NO. : 10/469529
DATED : January 26, 2010
INVENTOR(S) : Gadkari et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Twenty-third Day of November, 2010

David J. Kappos
*Director of the United States Patent and Trademark Office*